(12) United States Patent
Thorvardarson et al.

(10) Patent No.: US 8,881,682 B2
(45) Date of Patent: Nov. 11, 2014

(54) SUBMERSIBLE CAGE AND SYSTEM FOR FISH FARMING

(75) Inventors: Jon Thorvardarson, Kopavogur (IS); Luke Aymar, Saint John (CA); Prasad Bodhani, Saint John (CA); Edwin Elrick, Saint John (CA); Rick Grant, Saint John (CA); Thomas Mathieson, Saint John (CA); Christopher Saulnier, Saint John (CA); Andrew Storey, Saint John (CA)

(73) Assignee: Open Ocean Systems, Inc., St. John (CA)

( * ) Notice: Subject to any disclaimer, the term of this patent is extended or adjusted under 35 U.S.C. 154(b) by 1405 days.

(21) Appl. No.: 12/514,574

(22) PCT Filed: Nov. 7, 2007
(Under 37 CFR 1.47)

(86) PCT No.: PCT/CA2007/001991
§ 371 (c)(1),
(2), (4) Date: Dec. 20, 2010

(87) PCT Pub. No.: WO2008/058372
PCT Pub. Date: May 22, 2008

(65) Prior Publication Data
US 2011/0126447 A1     Jun. 2, 2011

Related U.S. Application Data

(63) Continuation-in-part of application No. 11/559,058, filed on Nov. 13, 2006, now Pat. No. 7,748,349.

(51) Int. Cl.
*A01K 63/04* (2006.01)
*A01K 61/00* (2006.01)

(52) U.S. Cl.
CPC .................................. *A01K 61/007* (2013.01)
USPC .......................................... 119/223; 119/232

(58) Field of Classification Search
USPC ......... 119/208, 223, 232, 239, 264, 215, 226, 119/207, 238; 134/22.18, 24, 167 R, 180
See application file for complete search history.

(56) References Cited

U.S. PATENT DOCUMENTS

| | | | |
|---|---|---|---|
| 5,521,571 A | 5/1996 | Laskaris et al. | |
| 2006/0096548 A1* | 5/2006 | Ytterland et al. | 119/223 |

FOREIGN PATENT DOCUMENTS

| | | | |
|---|---|---|---|
| FR | 2408302 A1 | 6/1979 | |
| FR | 2420920 A1 | 10/1979 | |
| GB | 2031251 | 4/1980 | |
| WO | 8203152 A1 | 9/1982 | |
| WO | 9203921 A1 | 3/1992 | |
| WO | WO 9203921 A1 * | 3/1992 | ............. A01K 61/00 |
| WO | 2004073396 A1 | 9/2004 | |

* cited by examiner

*Primary Examiner* — Kristen C Hayes
(74) *Attorney, Agent, or Firm* — Wood, Herron & Evans, LLP

(57) ABSTRACT

A submersible rotatable cage for fish farming comprises a central axle, a buoyant structure positioned about the central axle, and a netting attached to the buoyant structure. An actuator can be placed in operable communication with at least part of the buoyant structure to facilitate rotation of the buoyant structure about the central axle while the cage is in a submerged position. The cage can form part of a system, which includes a net cleaning apparatus, a tethering mechanism and sweep net, that forms the basis for underwater fish farming.

37 Claims, 18 Drawing Sheets

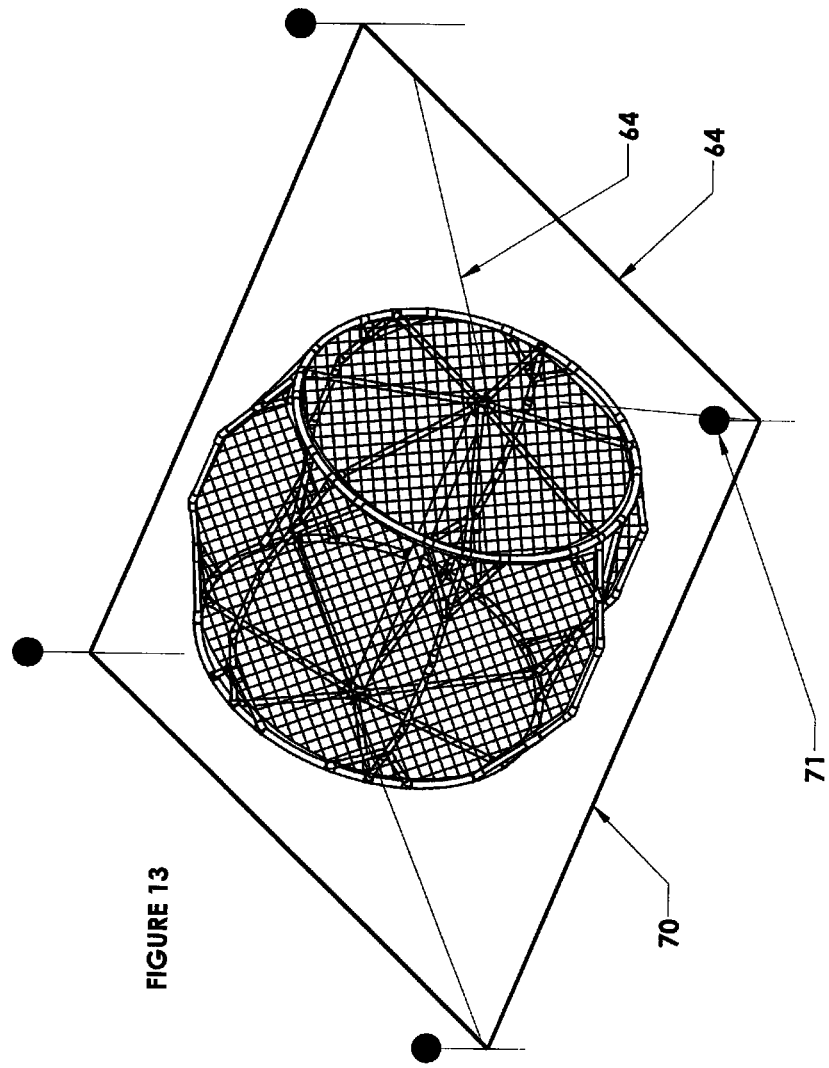

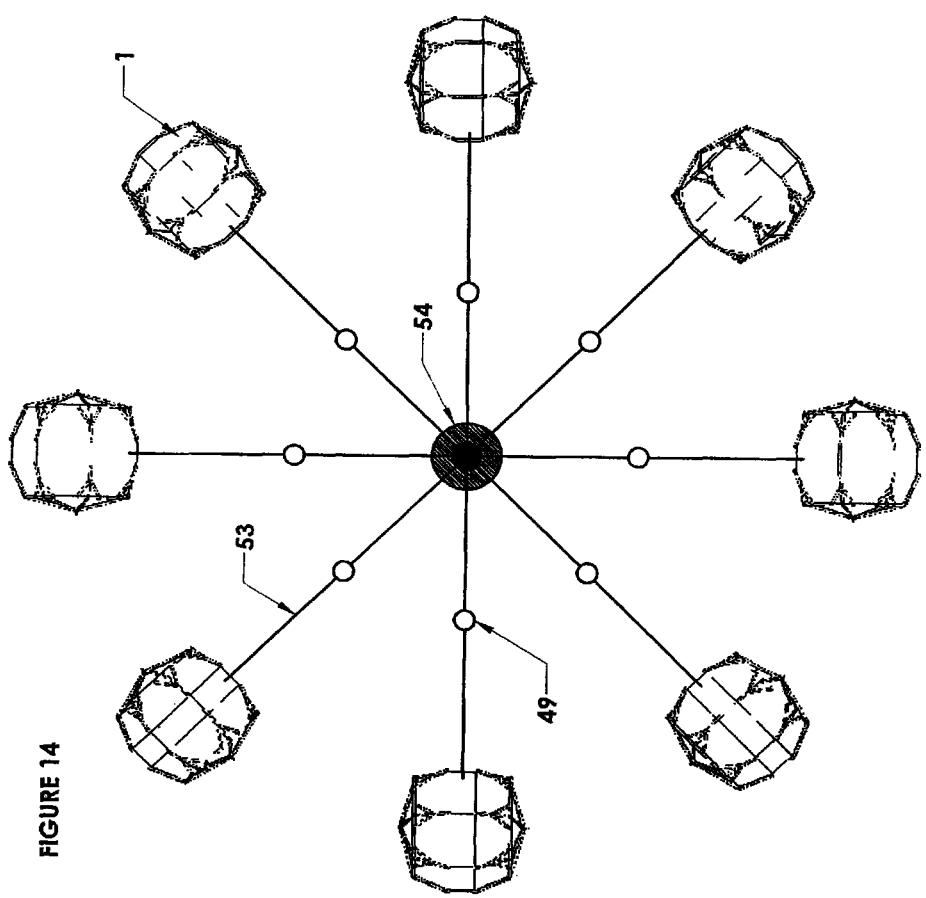

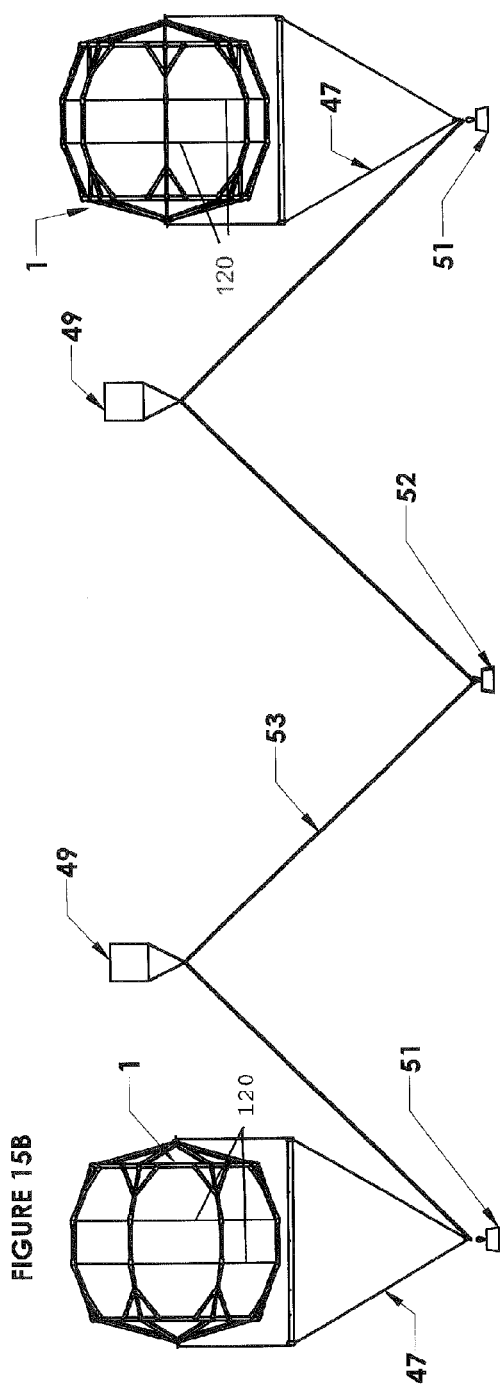
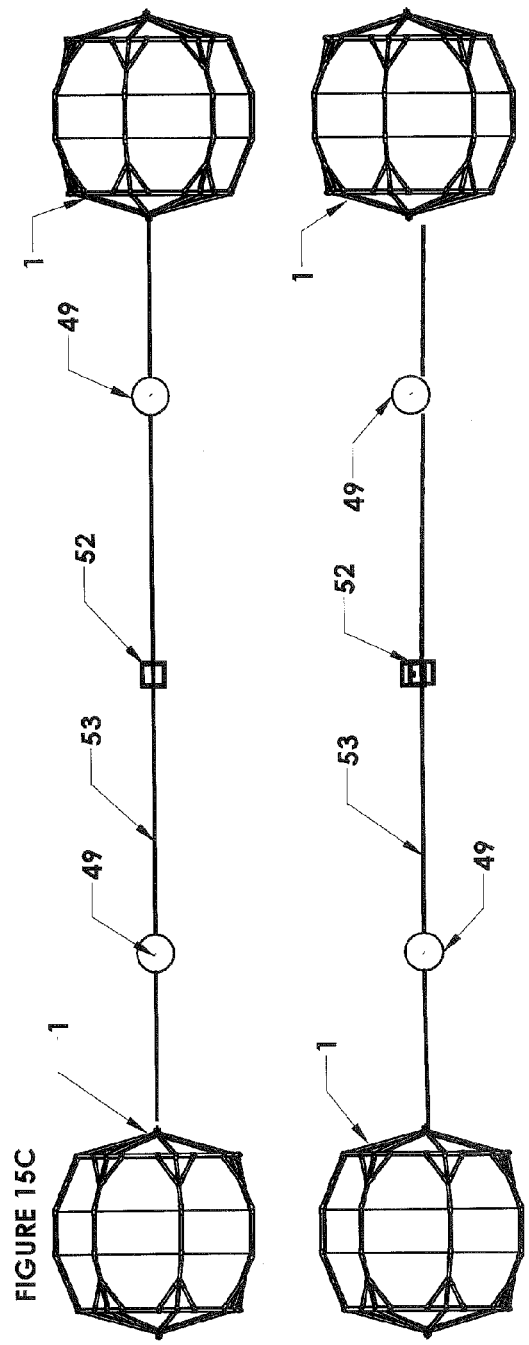

SUBMERSIBLE CAGE AND SYSTEM FOR FISH FARMING

FIELD OF THE INVENTION

The present invention generally relates to a cage and system for fish farming. More specifically, the present invention relates to a submersible rotatable cage and system for both surface and underwater fish farming.

BACKGROUND OF THE INVENTION

Fish farming is an industry growing at a rapid rate, which is driven by the demand for increased quantities of food resources and the decrease of natural sources of fish in lakes and oceans. Fish farming usually involves floating cages, which are positioned just offshore in fjords, seas, lakes or other natural bodies of water. The fish cages are usually wide cages comprising a rigid cylindrical frame structure positioned horizontally on the surface of the body of water and a net system allowing water to flow into and out of the cage. The net system is made with net meshes of sufficiently small size to retain the fish inside the cage. Such conventional cages typically have a circular bottom net, a cylindrical sidewall net extending to the water surface and an open top end, which may also be covered by a net.

In the most common setup for fish farming plants, a number of floating net cages are anchored close to shore using buoys and weights to stabilize the cages in the water. An optimal installation for fish farms of this sort is in sheltered waters such as bays and fjords and these setups often comprise support frames with gangways for operational purposes, such as maintenance and feeding.

Surface cages, however, are sensitive to severe weather conditions, such as high winds, waves and ice, which can be a serious threat in northern areas. Submersible cages have been suggested and tested. However, these types of cages have not become commercially feasible due to problems with stability, handling and cost.

For example, PCT Publication No. WO 82/03152 to Rene and French Patent Application No. 2420920 to kin both describe substantially cylindrical shaped cages that can rotate when in a semi-submerged position. An inherent problem with cylindrical cages having long spans connecting rings is that the structural integrity of the cage often becomes compromised during severe changes in its environment.

Spherical or geodesic shaped cages have also been proposed. For example, PCT Publication No. WO 2006/050386 to Ocean Farm Technologies, Inc., and United States Patent Publication No. 2006/0096548 to Ytterland et al., both describe spherical or geodesic shaped cages.

In some instances, spherical or geodesic shaped cages can better withstand environmental changes. However, it may be more technically challenging to rotate a spherical cage while submerged. The cage described in PCT Publication No. WO 2006/050386 is made of individual triangular net panels. The buoyancy of each panel can be controlled by selectively introducing air and/or water to the panels or a group of panels, thus allowing rotation of the sphere. Depending on the particular net panel that is to be rotated to the top of the cage, mooring lines are manually attached to hubs present at the intersection of adjacent net panels in order to facilitate rotation.

United States Patent Publication No. 2006/0096548 to Ytterland et al., describes another spherical cage that is attached to platform that circumferentially connects opposite ends of a central pole. Motors are provided on the platform at the intersection between the platform and the central pole. The motors allow the cage to be rotated when the platform is resting on the surface of the water. Rotation of the cage while submersed would be difficult, since the platform would have a tendency to rotate instead of the cage, therefore providing no functionality while submerged.

Accordingly, there is a need for a simple, robust, durable and commercially practical cage and system for commercially cultivating marine animals both on the surface and while submerged, which is easy to manufacture and install and can be maintained underwater and readily manipulated to allow for the collection of animals, sorting of animals and maintenance of the cage.

SUMMARY OF THE INVENTION

It is an object of the present invention to provide a submersible cage and system for fish farming which addresses the limitations of the prior art.

According to one aspect of the present invention, there is provided a submersible cage for aquaculture comprising: a central axle; a buoyant structure having a first wheel positioned at one end of the central axle and a second wheel positioned at the other end of the central axle, the wheels being connected by a plurality of segmented cross members; and a netting for attachment to the inside of the buoyant structure, wherein at least two segments of the cross members are angled away from the wheels and at least a portion of the cross member interconnecting the two angled segments is positioned parallel to the central axle.

In one embodiment, the cross member comprises three segments. A first segment is attached to and angled away from the first wheel, a second segment is attached to and angled away from the second wheel and the remaining segment is positioned parallel to the central axle.

In another embodiment, the submersible cage further comprises an actuator in operable communication with at least part of the buoyant structure and adapted to facilitate rotation of the structure about the central axle. The actuator can take many forms. For example, a series of valves may be provided in operable communication with the segmented cross members to allow controlled adjustment of the buoyancy of each segmented cross member. In addition, the actuator may be a motor assembly connected to the hub assembly of each of the first and second wheels. Furthermore, the actuator may be a series of propulsion means positioned along the segmented cross members and systematically controlled to cause the rotation of the buoyant structure about the central axle.

In yet another embodiment, the submersible cage may be provided with a sweep net, which extends radially from the central axle to the netting. A grading panel and/or data collection panel may be provided in the sweep net to selectively harvest fish of a certain size and gather size and growth data on the fish.

In a further embodiment, the submersible cage may be equipped with a trapping entrance for entrapping marine animals. The trapping entrance being substantially funnel-shaped such that animals substantially above a desired size that have entered the cage cannot readily exit the cage through the trapping entrance.

According to a another aspect of the present invention, there is provided a net cleaning device for an aquaculture cage having a central axle. The device comprising: at least one positively buoyant arm for attachment to the central axle; and an apertured cross member attached at an angle to said arm. Whereby the positively buoyant arm extends radially from the central axle when positioned in the aquaculture cage for positioning the apertured cross member in the vicinity of the netting and the apertures in the cross member permit expulsion of air, fluid or combinations thereof.

According to further aspect of the present invention, there is provided a system for controlling movement of a submersible cage. The system comprising: a submersible cage having a central axle; a buoyant structure having a first wheel positioned at one end of the central axle and a second wheel positioned at the other end of the central axle, the wheels each having a hub assembly radially connected to a partially hollow rim by a plurality of spokes and first and second wheels being connected by a plurality of cross members, a netting for attachment to the inside of the buoyant structure, a motor assembly connected to the hub assembly of each of the first and second wheels, tethering lines attached to each motor assembly, each tethering line passes through a fixation point and converges onto a mooring line that is attached to a mooring, and a variable buoyant element positioned along the mooring line to control the vertical positioning of the submersible cage with respect to the sea bed. Whereby activation of the motor assembly causes the buoyant structure to rotate about the central axle and altering the buoyancy in the buoyant element controls the vertical positioning of the submersible cage with respect to the seabed.

DETAILED DESCRIPTION OF THE DRAWINGS

FIG. 12 shows the submersible cage in the C) submerged position and D) surfaced position according to yet another embodiment of the present invention;

FIG. 13 shows a possible mooring arrangement for the submersible cage according to an embodiment of the present invention;

FIG. 14 shows a possible arrangement for the submersible cages of the present invention in a fish farm;

Figure 16:
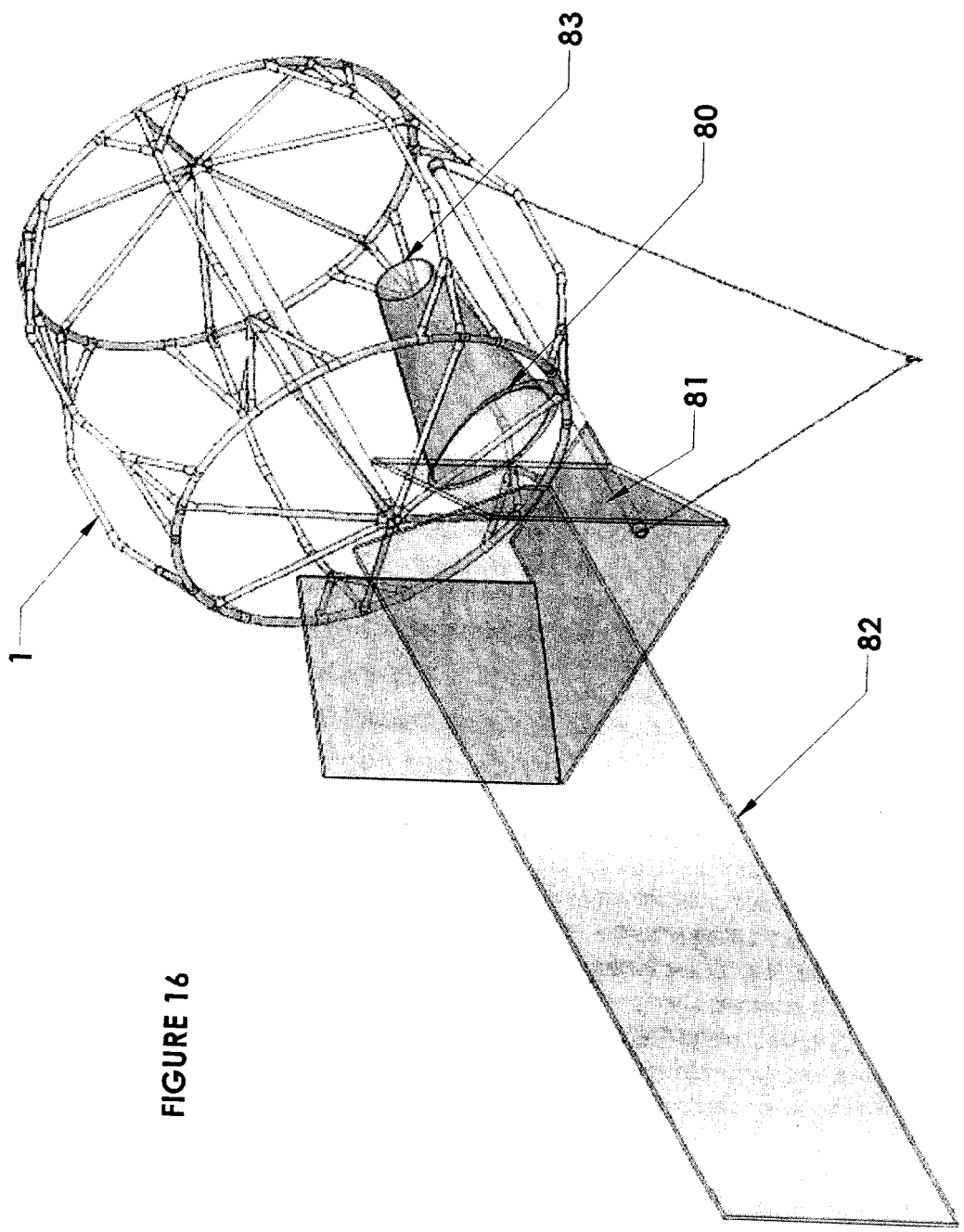

FIGS. 15 A-C show possible arrangements for the submersible cages of the present invention in a fish farm environment;

FIG. 16 shows the submersible cage of the present invention adapted to be used as a fish trapping device.

DETAILED DESCRIPTION OF THE INVENTION

The following description is of a preferred embodiment by way of example only and without limitation to the combination of features necessary for carrying the invention into effect.

Figure 1:
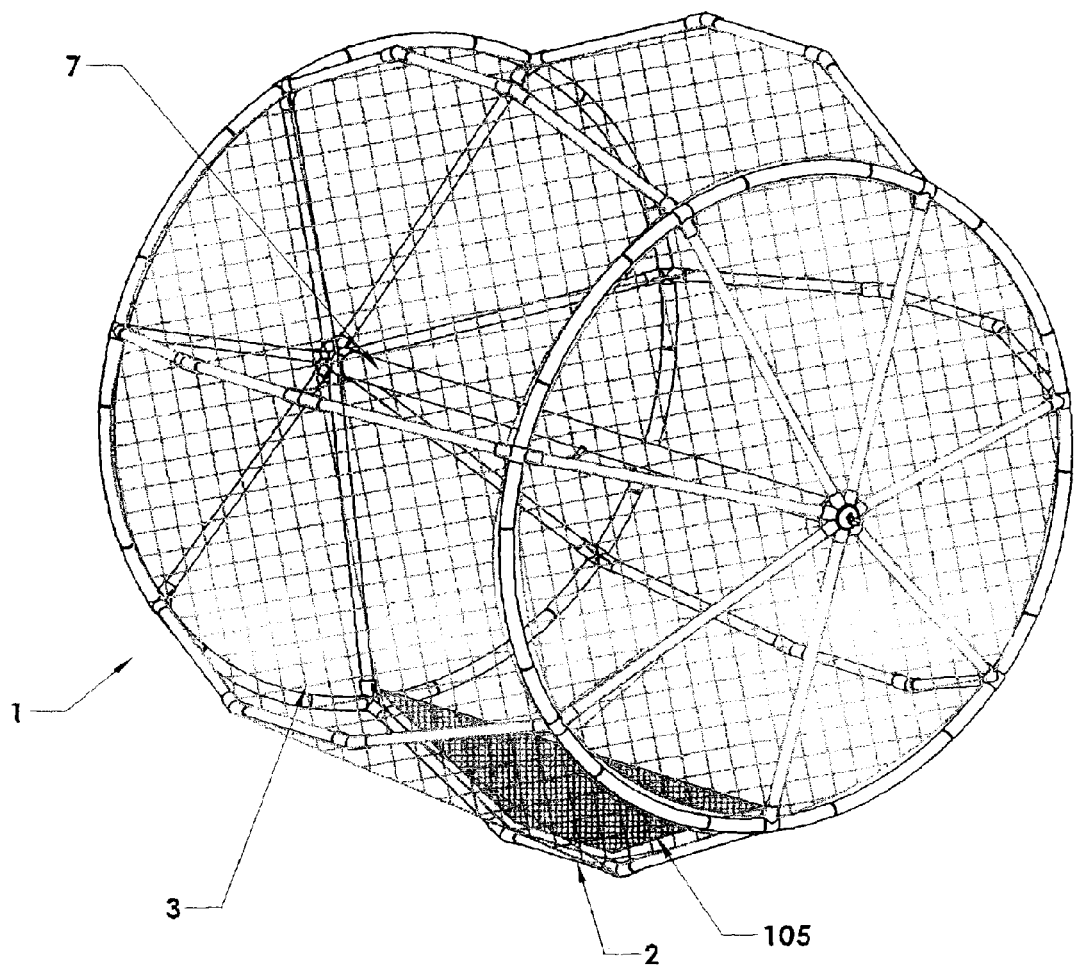
FIG. 1 is a perspective view of the submersible cage of the present invention.
Figure 2:
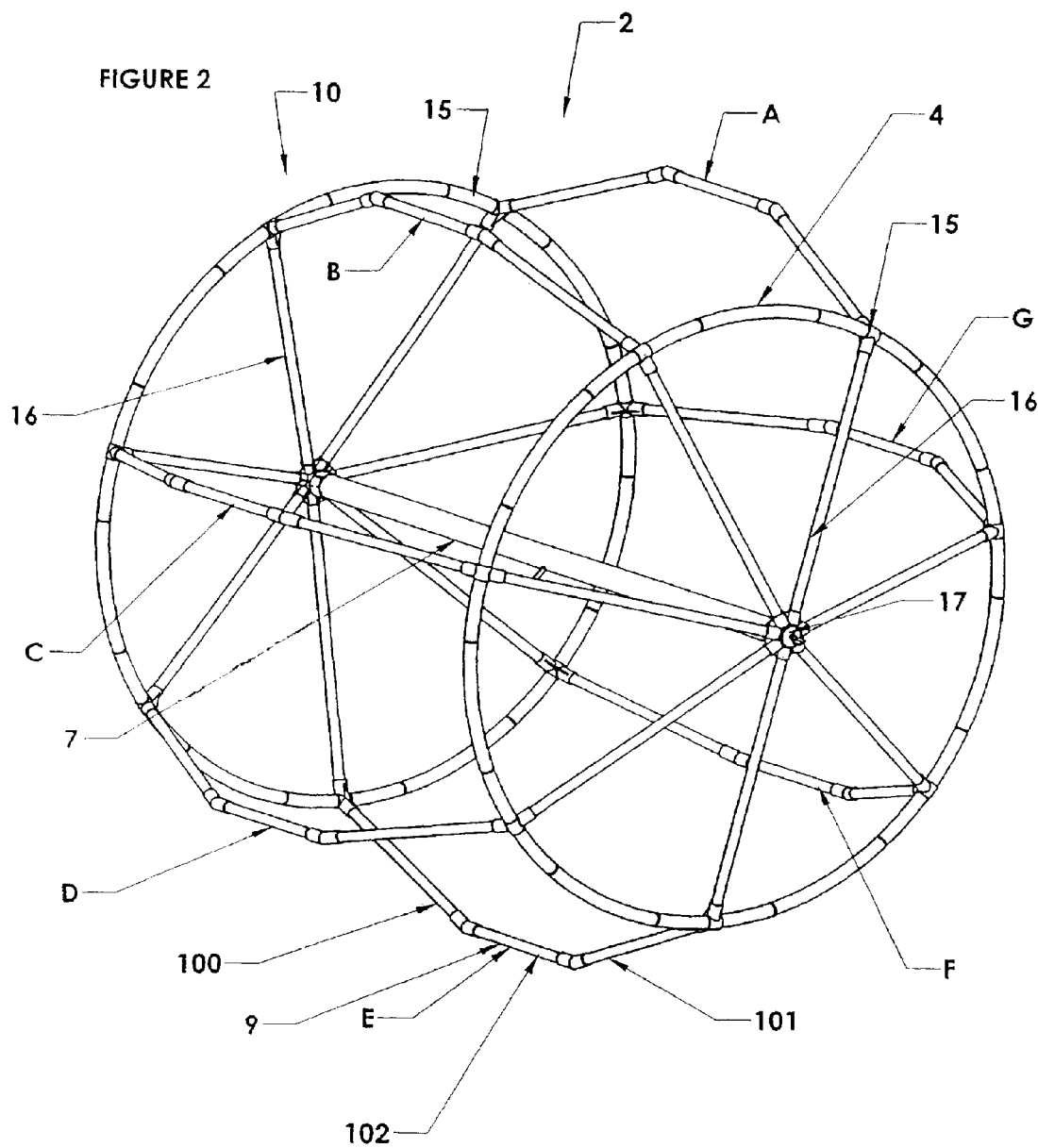
FIG. 2 is a perspective view of the buoyant structure of the present invention.

As illustrated in FIG. 1, the submersible cage (1) for aquaculture comprises a central axle (7), a buoyant structure (2) and a netting (3). As shown in FIG. 2, the buoyant structure (2) has a first wheel (4) positioned at one end of the central axle (7) and a second wheel (10) positioned at the other end of the central axle (7). A plurality of segmented cross-members (9) connect the first wheel (4) to the second wheel (10).

Description of the structure and function of the wheels (4, 10) will be provided using the first wheel (4) as an example. However, it will be readily understood by those skilled in the art that the second wheel (10) will have a similar structure and function. As shown in FIG. 2, the first wheel (4) can comprise a partially hollow rim (15) connected to hub assembly (17) by a plurality of spokes (16).

Alternatively, the spokes (16) can be connected at one end to the hub assembly (17) and at the end to the cross-members (9) near the intersection between the partially hollow rim (15) and cross-member (9). At least some of the spokes (16) can be partially hollow in order to allow controlled adjustment of the buoyancy thereof. The partially hollow rim (15) can be filled with a gas or liquid to adjust the buoyancy of the structure (2). For example, vents or nozzles can be connected to hoses or pressurized cylinders to allow for remote controlled injection of gas or liquid into the partially hollow rim (15). When hoses are connected to the partially hollow rim (15) swivel connections should be used to prevent the twisting of the hoses when the wheels (4, 10) are rotated.

Figure 3:
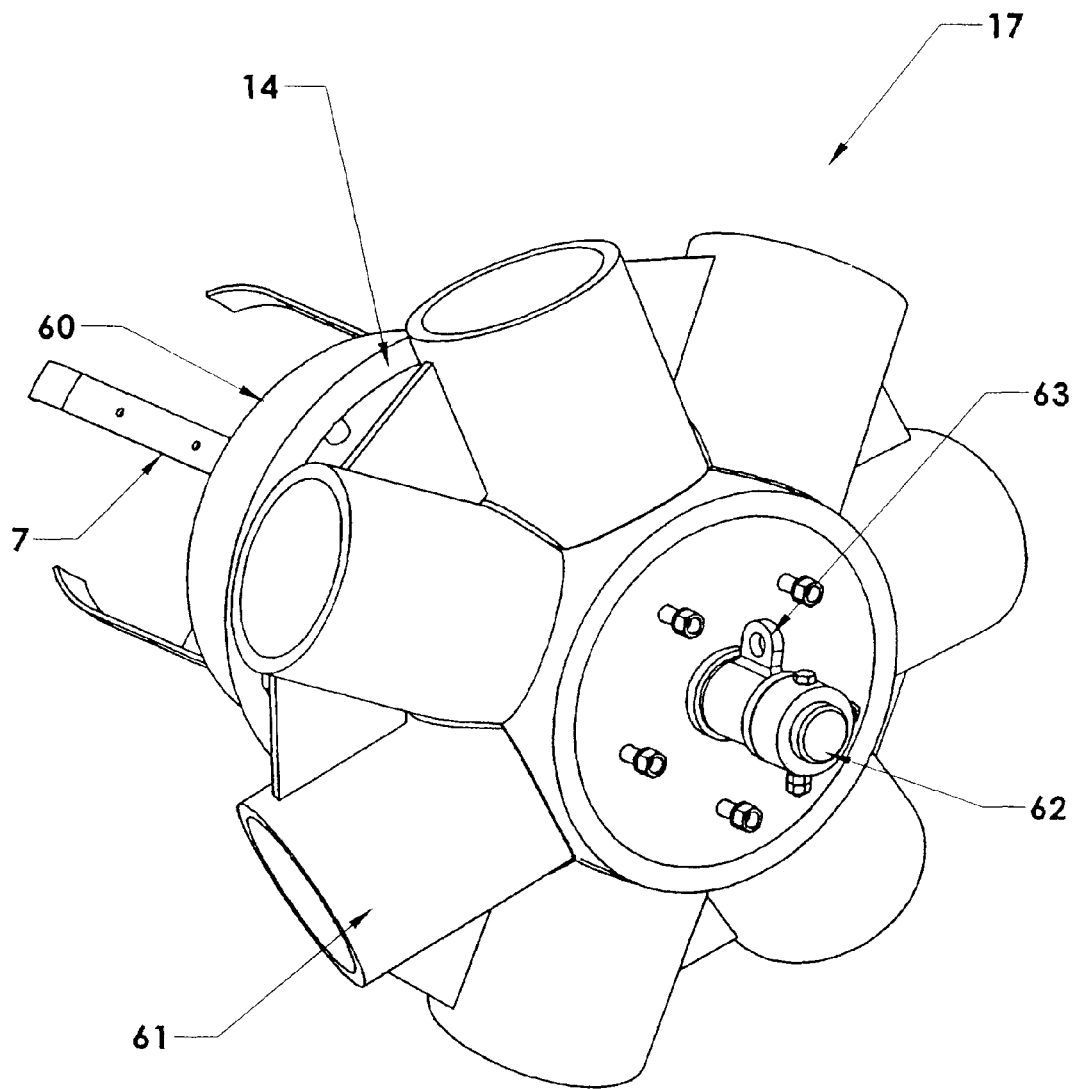
FIG. 3 is a perspective view of the hub assembly of the present invention.

As illustrated in FIG. 3, the hub assembly (17) comprises an outer sleeve (60) that at least partially encircles the central axle (7), a series of support points (61) for the spokes (16) and a hub axle (62). In one embodiment, the hub axle (62) is arranged to function as a stabilizing and alignment tool, with an outer bearing attachment point (63) for the mooring lines (64) and/or sling (47) which allows the cage (1) to rotate, and to act as the main entry point for which services and materials can be introduced to the interior of the netting (3). The hub assembly (17) is meant to be interchangeable to allow for maintenance, upgradeability and to permit for the introduction of new functionalities.

In certain circumstances, such as extremely harsh environments, it may be advantageous to provide additional wheels along the central axle (7) to increase the overall stability of the submersible cage (1) and assist in the rotation of the cage (1). More particularly, as illustrated in FIGS. 12C and 12D, for example, additional wheels (120) may encircle the central axle (7) and be positioned between the first wheel (4) and the second wheel (10).

Figure 9:
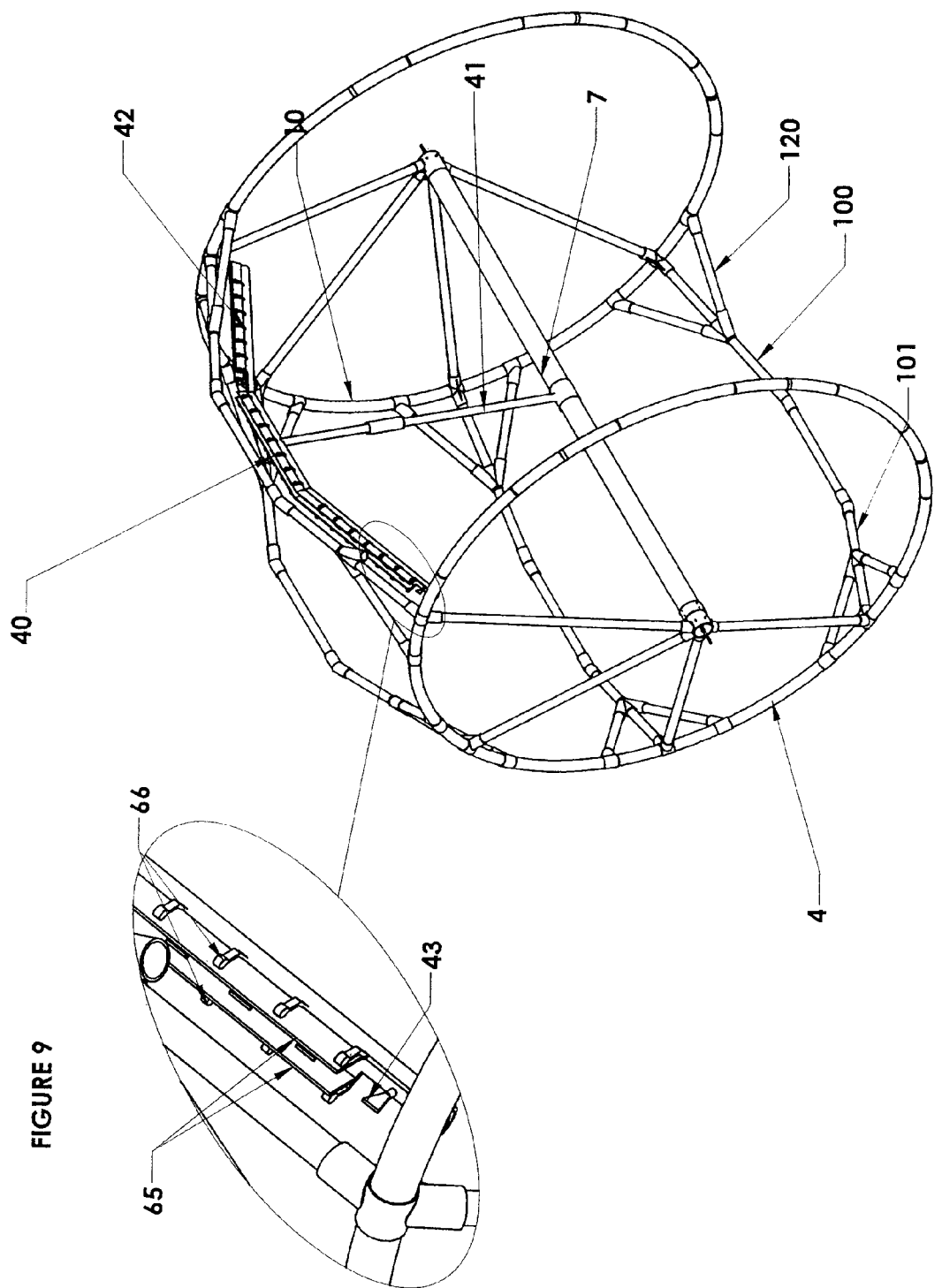
FIG. 9 is a perspective view of a net cleaning apparatus according to an embodiment of the present invention.

As shown in FIG. 2, segmented cross-members (9) connect the first wheel (4) to the second wheel (10). In order to improve the overall structural integrity of the buoyant structure (2) and to increase the holding capacity of the cage, at least two segments (100, 101) of the cross-members (9) are angled away from the wheels (4, 10). At least a portion of the segment interconnecting the two angled segments (100, 101) is parallel to the central axle (7). In one embodiment, the cross-members (9) contain three segments (100-102). The first and second segments (100, 101) are attached to and angled away from the first and second wheels (4, 10), respectively, and the remaining segment (102) is parallel to the central axle (7). As shown in FIG. 9, support members (120) connecting the wheels (4, 10) to the cross-members (9) can be provided to improve the overall stability of the individual cross-members (9).

In the event additional wheels are provided, the cross-members (9) can connect the additional wheels to one another or the first or second wheels (4, 10).

Figure 4:
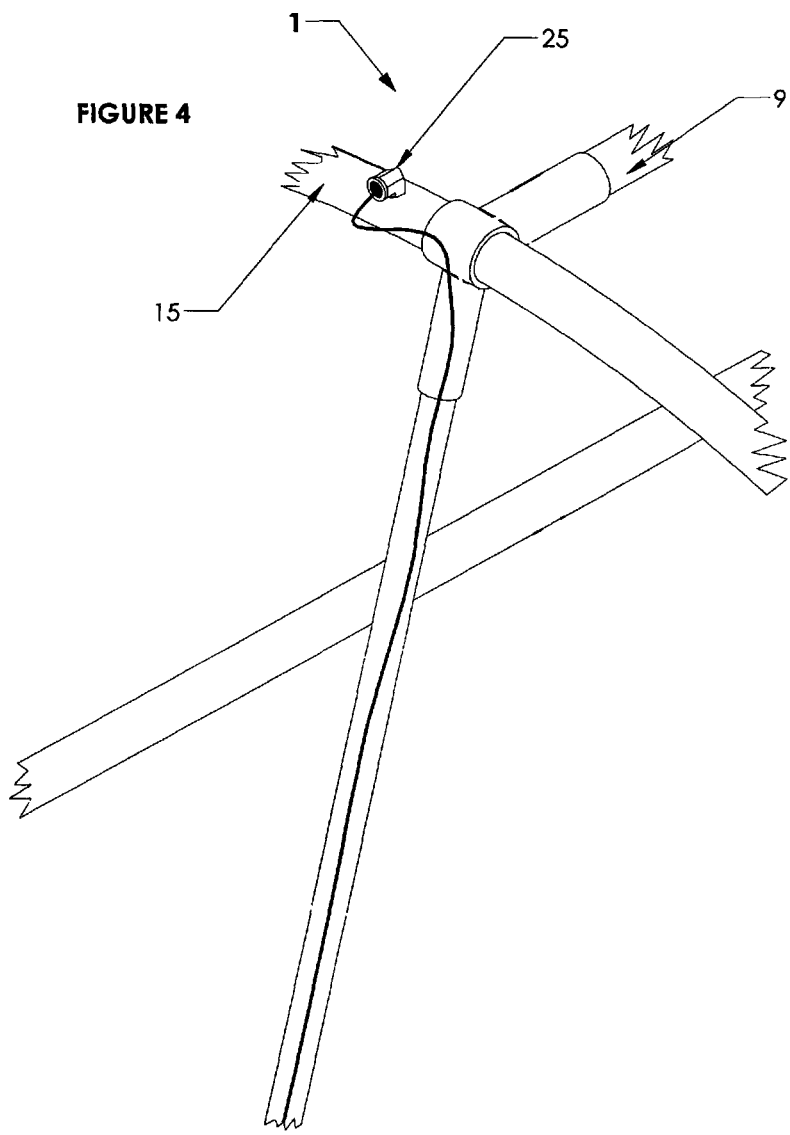
FIG. 4 is a perspective view of the valves near the intersection between cross-members and rims of the present invention.

In one embodiment, the segmented cross-members (9) can be filled with gas or liquid to alter the overall buoyancy of the cage (1). This can be achieved, for example, by providing valves (25) at or near the intersection between the partially hollow rim (15) and the cross-members (9) (see FIG. 4). By providing valves (25) at or near the intersection between the partially hollow rim (15) and the cross-members (9), the buoyancy of each cross-member (9) can be controlled systematically and individually. Systemic control of the buoyancy of each cross-member (9) will permit the controlled rotation of the cage (1) while submerged. For example, for counter-clockwise rotation of the cage (1) shown in FIG. 2, those cross-members (9) identified by reference letters A, B, C and D, would be filled with a liquid, whereas cross-members E, F and G would be filled with a gas. When the cross-members (9) filled with gas (E, F and G) reach the upward and vertical position, the gas would be expelled from the cross-member (9) and replaced with a liquid with a density greater than or equal to environment in which the cage is submerged. Similarly, when the cross-members (9) filled with liquid (A, B, C and D) reach the downward and vertical position, the liquid would be expelled from the cross-member (9) and replaced with a gas having a density less than the environment in which the cage (1) is submerged.

In an alternate embodiment, propulsion means, such as jets (not shown), can be positioned along the cross-members (9) and systemically controlled to cause rotation of the cage (1) while submerged.

The buoyant structure (2) comprising the wheels (4, 10) and cross-members (9) is preferably made from an inherently buoyant material, such as high density polyethylene, fibre reinforced plastic or a high density polyethylene composite. However, it will be readily understood that the only criteria that needs to be met with respect to the buoyant structure is that it does automatically sink to the sea bed when submerged. Hollow aluminium tubes can also be used for the cross-members (9). Typically, the buoyant structure (2) is octagonal in shape, when viewed in a plane containing the longitudinal axis of the central axle (7). However, many additional shapes can be envisaged using the elements of the buoyant structure.

As illustrated in FIG. 1 the netting (3) is positioned within the confines of the buoyant structure (2). Since the netting (3) is not stretched over the structure (2) itself there is less chance of the netting becoming worn or damaged by the structure (2). Preferred netting materials include, but are not limited to, DYNEEMA™ or SPECTRA™ ultra-high-molecular-weight polyethylene, or other similar high performance polyethylene fibers. Conventional materials, such as rings and hooks, can be used to attach the netting (3) to the structure (2). However, the placement of the netting (3) within the confines of the structure (2) allows tension sensors (not shown) to be used to connect the netting (3) to the structure (2). These tension sensors can be used to detect any damage, such as a tear, that may have occurred to the netting (3). Alternatively, sensors can be integrated with or placed on the netting (3) to monitor the structural integrity of the netting (3). A collar (14) is located on each hub assembly (17) to fasten, secure and seal the cylindrical netting (3) to the hub assemblies (17) at each end of the central axle (7) (see FIG. 3).

The central axle (7) is attached at both ends to the wheels (4, 10) (FIG. 3) through the hub assembly (17). The central axle (7) is positioned centrally along the longitudinal axis of the interior of the netting (3). The central axle (7) can be made of the same material as the buoyant structure (2) or can be made of different material. In one embodiment, the central axle (7) is made of Weholite™. Accordingly, the central axle (7) can be provided as a partially hollow structure with one or more apertures to permit the introduction of services, such as food, air, liquid, therapeutics, data and power sources, to the interior of the netting (3). In addition, service lines can be attached to the central axle (7) through the hub assembly (17) thus allowing the remote introduction of such services. Furthermore, the central axle (7) can be attached to a vacuum line to capture the marine life during the harvesting process.

Figure 5:
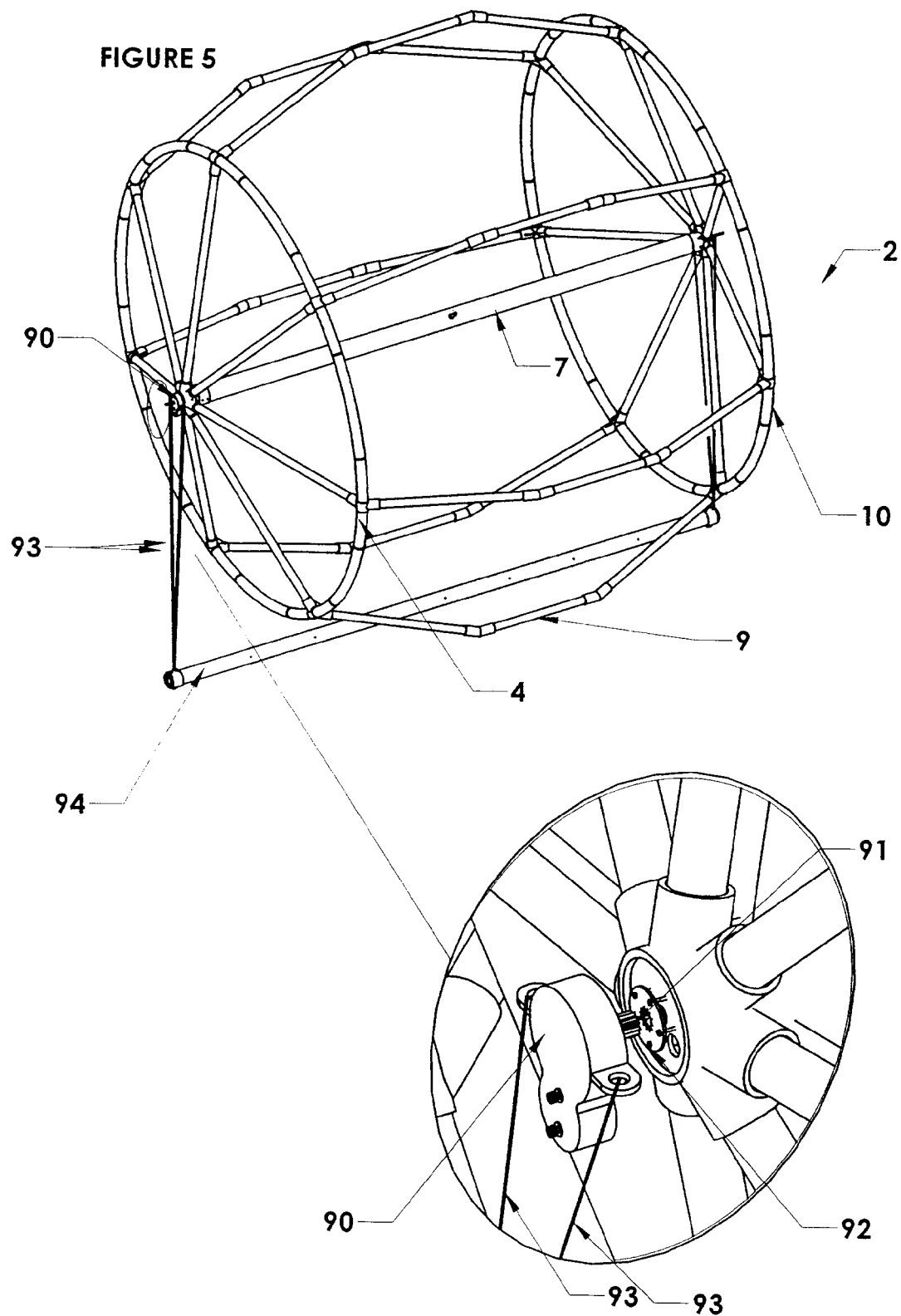
FIG. 5 is a perspective view of the motor assembly attached to the hub assembly of the present invention.

The cage (1) of the present invention can also be rotating while in the submerged position through a motor assembly (90), which can be connected to the hub assembly (17) of one or both of the first and second wheels (4, 10) (see FIG. 5). For example, a spline (91) driven by the motor assembly (90) can interact with a corresponding spline hub (92) on the hub assembly (17) to cause rotation of the buoyant structure (2). During rotation, the motor assembly (90) should be stably oriented with respect to the cage (1). For example, the motor assembly (90) could include a torque plate which is held in position by a mooring line anchored to the sea bed. In this arrangement, the positive buoyancy of the cage (1) puts tension into the mooring line to stabilize the motor assembly (90) and prevent the motor assembly (90) from rotating along with the cage (1) during operation. Another way this can be accomplished is by providing tethers (93) on the motor assembly (90), which are attached to stabilizing beam or spreader bar (94) that extends the length of the buoyant structure (2).

Figure 6:
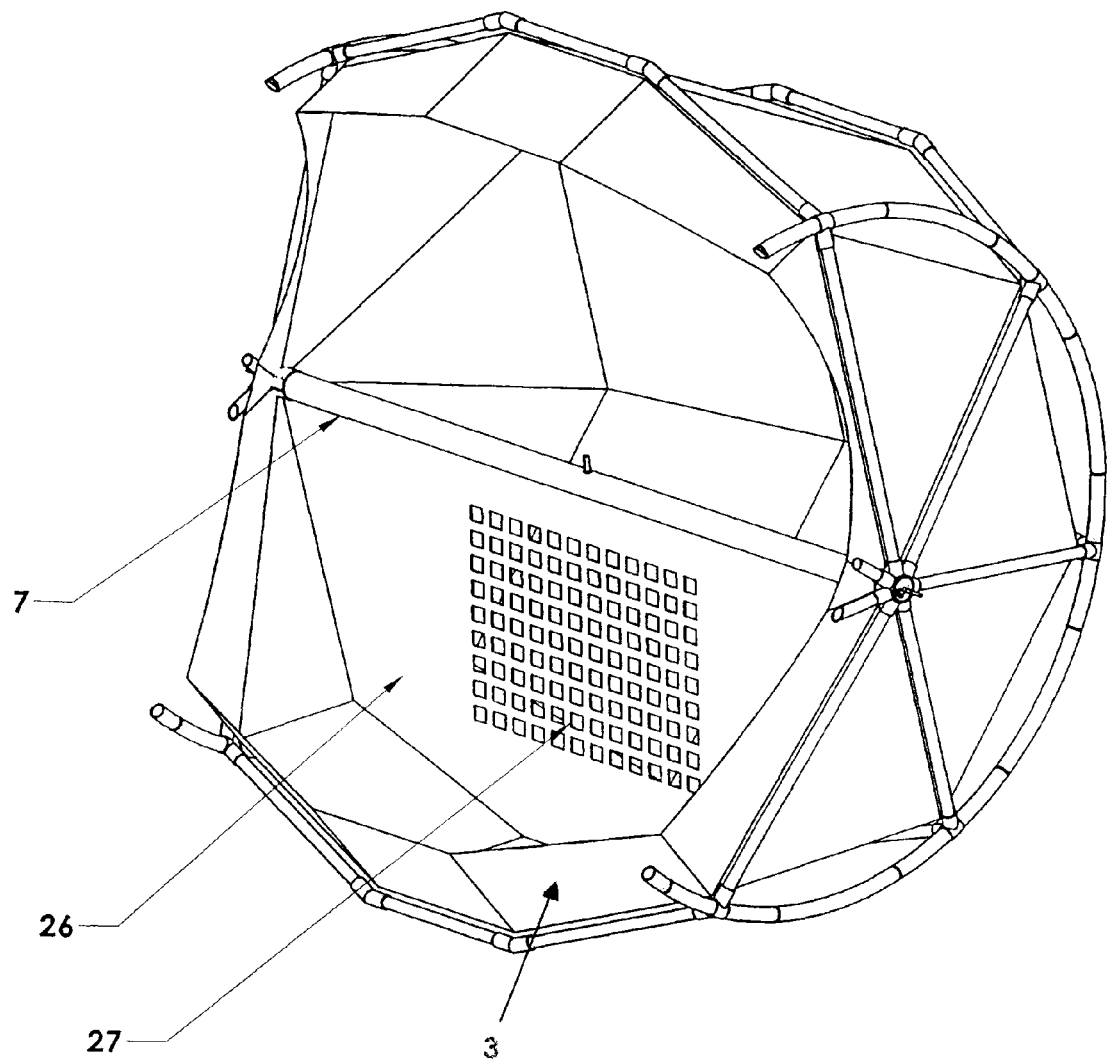
FIG. 6 is a cutaway view of the submersible cage according to an embodiment of the present invention.
Figure 7:
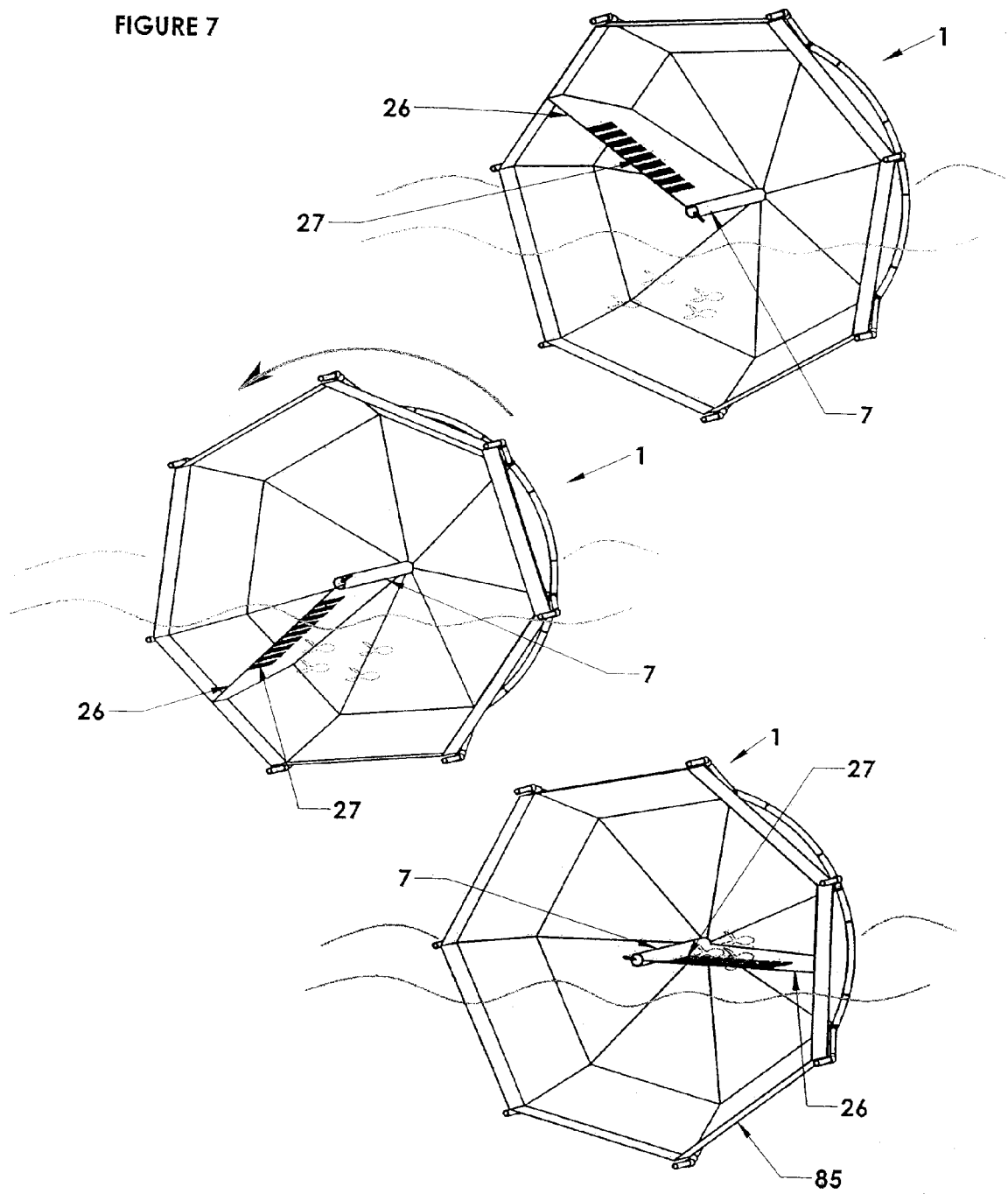
FIG. 7 is a cutaway view of the cage showing the rotation of the submersible cage according to an embodiment of the present invention.

FIG. 6 illustrates the sweep net (26) of the present invention. The sweep net (26) provides a barrier that extends radially from the central axle (7) to the netting (3). Typically, the sweep net (26) abuts the netting (3) along the longitudinal axis of the netting (3) or at an arc with respect to the longitudinal axis of the netting (3). Alternatively, the sweep net (26) can be arranged in a helical manner about the central axle, thus providing means to gather fish at one end of the netting (3) As shown in FIG. 7, rotation of the cage (1) about its central axle (7) collects the marine life contained in the sweep net (26). Furthermore, a grading panel (27) (FIG. 6) can be provided in the sweep net (26) to allow grading of the marine life while the sweep net (26) is being rotated. The grading panel (27) can be provided in a predetermined mesh size or can be provided as an adjustable panel depending on the application and data required.

Figure 8:
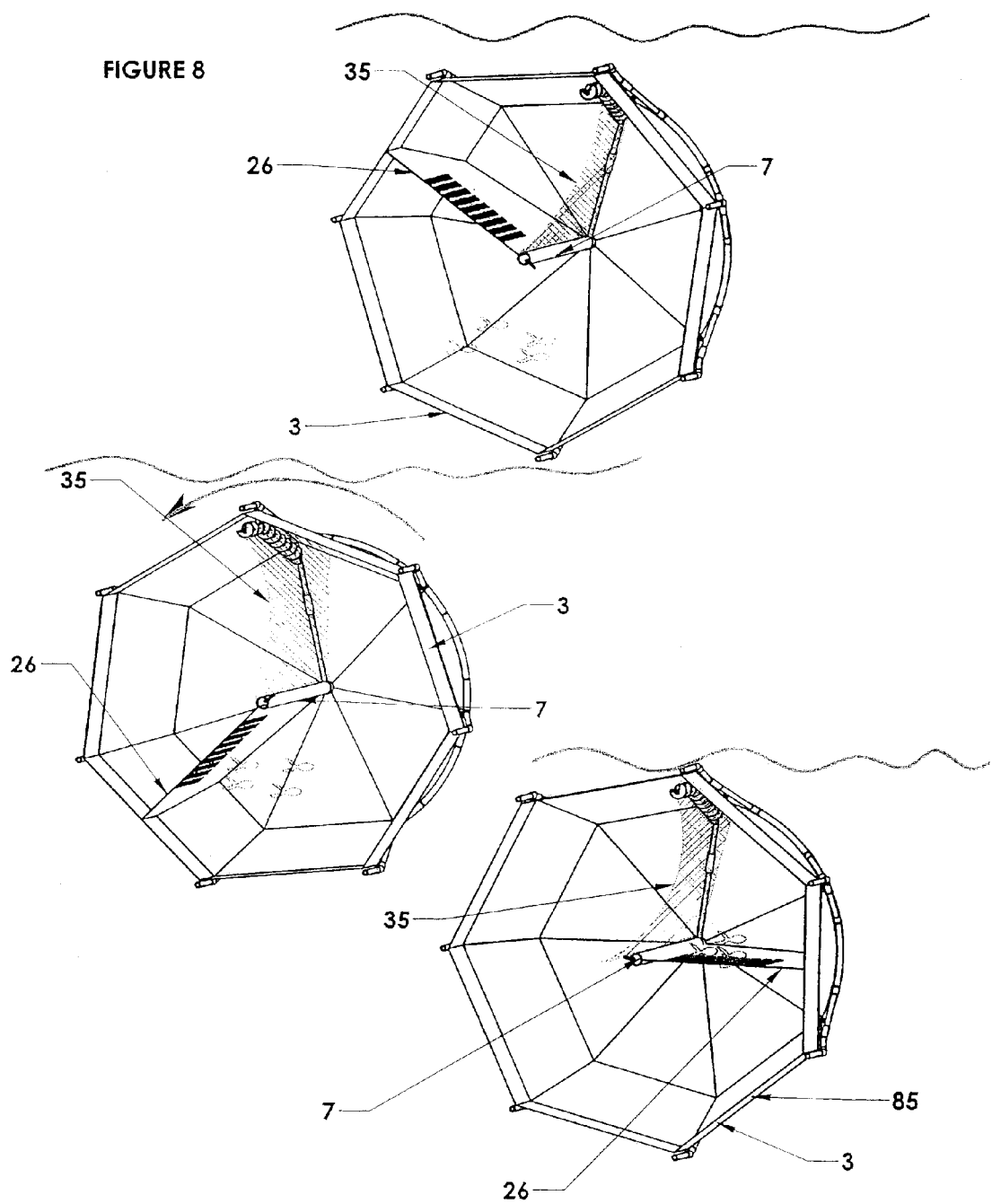
FIG. 8 is a cutaway view of the cage showing the rotation of the submersible cage according to another embodiment of the present invention.

The sweep net (26) can used either when the cage (1) is partially submerged or when the cage is fully submerged. As shown in FIG. 7, when the cage (1) is partially submerged, the surface of the water will act as a barrier to prevent the marine life from moving away from, and thus escaping, the sweep net (26). Alternatively, if the sweep net (26) is rotated in the fully submerged position, a physical barrier (35) must be provided in order for the sweep net to catch the marine life housed in the netting (3) (see FIG. 8). The physical barrier (35) can be a stationary net that also extends radially from the central axle (7) to the netting (3) or a wall of bubbles resulting from the expulsion of a gas from the central axle (7). For example, the physical barrier (35) may be a wall of air bubbles expelled from the central axle (7). In operation, the sweep net (26) will move in either a clockwise or counter-clockwise direction to a predetermined point where the marine life is trapped between the sweep net (26) and the physical barrier (35). A removable panel or door (85) can be provided in the netting (3) to allow access to the gathered fish.

As shown in FIG. 1, a secondary net (105) can be provided within the interior of the netting (3) in order to gather the dead fish contained in the cage (1). The secondary net (105) is attached to the interior of the netting (3) and occupies the space defined by the nearest cross-member (9). Unlike the sweep net (26), the secondary net (105) does not extend to the central axle (7) allowing for mobile fish to escape the secondary net (105). In operation, dead fish gather in the bottom of the netting (3) and are swept to the surface of the water by the secondary net (105) for removal.

Figure 10:
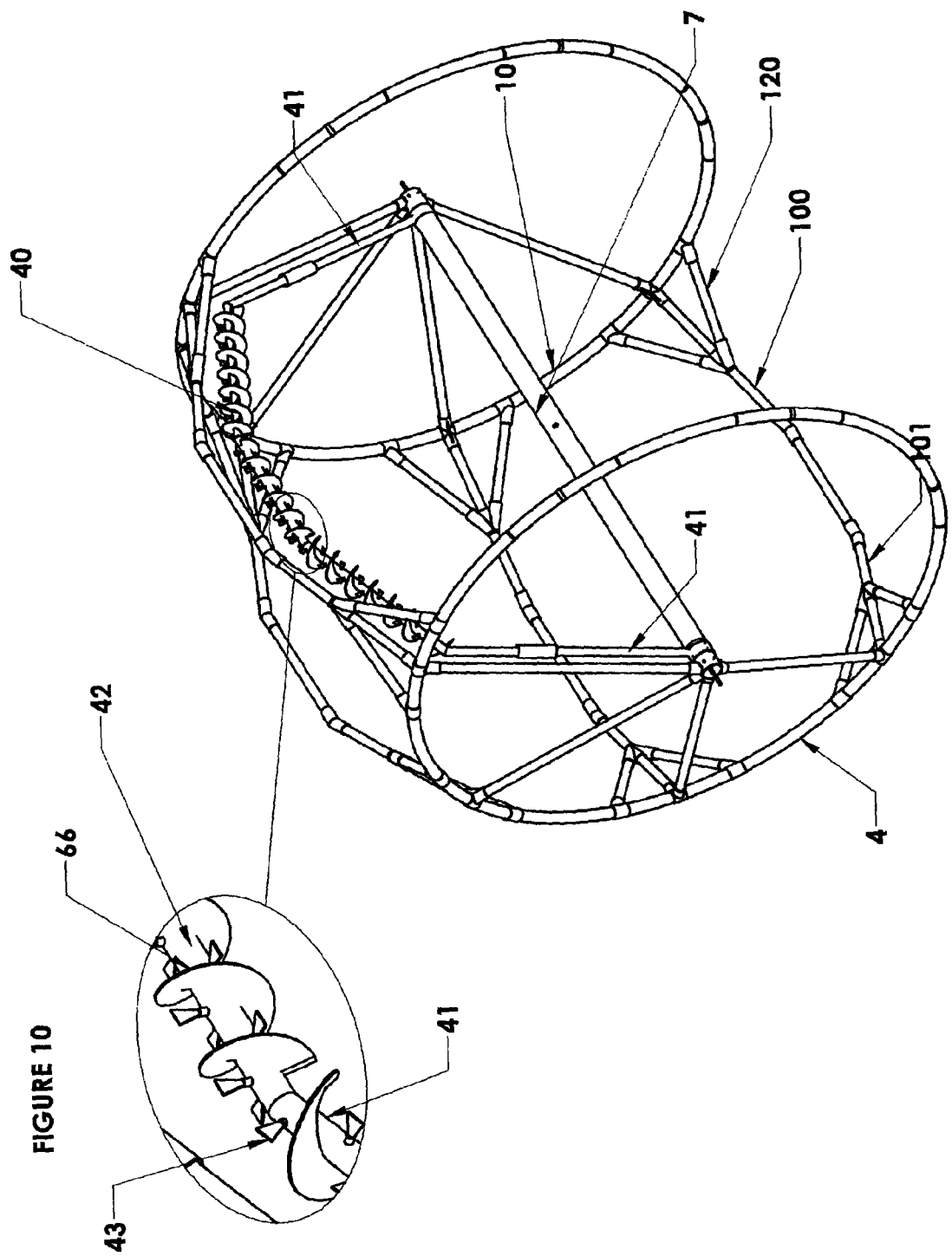
FIG. 10 is a perspective view of a net cleaning apparatus according to another embodiment of the present invention.

As shown in FIG. 9, the submersible cage (1) can be equipped with a net cleaning apparatus (40). The net cleaning apparatus (40) comprises an arm (41) extending radially from the central axle (7) and connected to a partially hollow cross-member (42), which extends wholly or partially the distance between the first and second wheels (4, 10). In an embodiment of the present invention, two positively buoyant arms (41) are connected to either end of the central axle (7) and the cross-member (42) connects the two positively buoyant arms (41) (see FIG. 10). The cross-member (42) is positioned in close communication with the netting (3) and contains a plurality of apertures (43) in which a fluid and/or a gas can be expelled towards the netting (3). Nozzles or jets can be used in conjunction with the apertures (43) to increase the pressure in which the liquid and/or gas is expelled from the cross-member (42), thus increasing the cleaning efficiency of the net cleaning apparatus (40).

In operation, the net cleaning apparatus (40) is activated by introducing pressurized gas and/or liquid through the cross-member (42) by either hoses connected to a remote source, or, by pressurized containers connected to the hub assembly (17) and/or the central axle (7) and channelled to the cross-member (42). The gas and/or liquid is expelled from the apertures (43) in the cross-member (42) towards the netting (3). Rotation of the buoyant structure (2), as described above, causes the netting (3) to be passed over the net cleaning apparatus (40) to effect cleaning of the netting (3). Alternately, the net cleaning apparatus (40) can be rotated within the netting (3) while the netting (3) is maintained in a stationary semi-stationary position.

To assist in the cleaning of the netting (3) brushes (66) can be provided along the length of the cross-member (42). For example, the brushes (66) can be arranged as a helix over the surface of the cross-member (42) with the apertures (43) also arranged helically interspersed between the helical turns of the brushes (66) (see FIG. 10). In this arrangement, it is preferable, that the cross-member (42) is rotatable with respect to the arm (41), in order to allow effective scrubbing and cleaning of the netting (3) as it is passed over the net cleaning apparatus (40). In addition to the brushes (66) provided on cross-member (42), brushes can also be provided on the arms (41) to effect cleaning of the ends walls of the netting (3) (not shown).

In order to limit the possibility of the netting (3) from becoming entangled with the cross-member (42) of the net cleaning apparatus (40), guides (65) can be provided in conjunction with the cross-member (42) that will maintain the netting (3) at a safe distance from the cross-member (42).

Although it is preferred that the arms (41) are positively buoyant, so that the arms (41) are positioned upward and vertical, the arms (41) could be fixed to the central axle (7) and positioned in any direction within the buoyant structure (2). Furthermore, the physical barrier (35) described above could be attached to the central axle (7), arms (41) and cross-member (42) (see FIG. 8).

The architecture and features of the cage (1) allow for all or most tasks associated with fish farming to be executed while of the cage (1) is submerged. For example, the ability of the cage (1) to rotate under water permits most tasks that are normally conducted with a cage in a partially submerged or surfaced state to be conducted while the cage (1) is submerged. In conjunction with the net cleaning apparatus (40), rotation of the cage (1) permits effective cleaning of the netting (3) without having to bring the cage to the surface or use divers to clean the cage (1). Furthermore, when the cage (1) is equipped with the sweep net (26) described above, all of the inhabitants of the cage (1) can be graded, counted and/or harvested while the cage (1) is submerged.

The architecture and features of the cage (1) also allow for the cage to act as a biomass information gathering interface. For example, the sweep net (26) with the grading panel (27) can be used to gather information on the growth rate of the fish, which can be used to regulate the amount of feed introduced to the cage (1) as well as influence the economic performance of the fish and the system. Moreover, the sweep net (26) can also be used to gather information on the health of the inhabitants. Data collected from the secondary net (105) can provided information with respect to the morality rate of the stock and the cause of death for the animals captured in the net (105).

Figure 11:
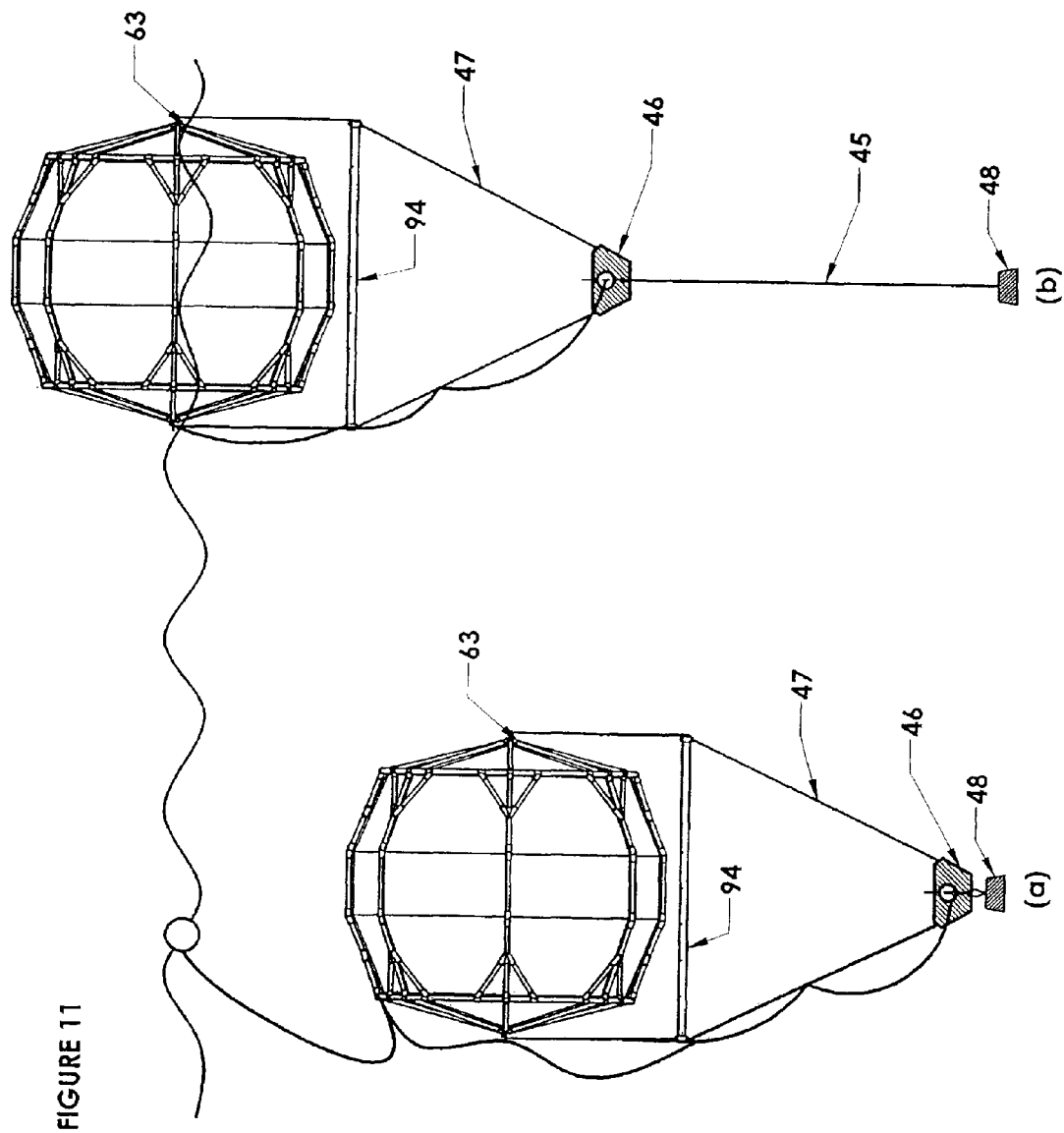
FIG. 11 shows the submersible cage in the A) submerged position and B) surfaced position according an embodiment of the present invention.

FIG. 11 shows a cage (1) submerged (FIG. 10a) and on the surface (FIG. 10b) connected by a single line tethering system (45). Ascent and decent of the cage (1) occurs by a winch (46). The winch (46) is preferably a hydraulic winch. The winch (46) is mounted below the cage on a fastening sling (47). The ends of the fastening sling (47) that attach to the cage (1) are connected by an outer bearing attachment point (63) on each hub assembly (17). The use of bearing attachment points (63) prevent the twisting of the fastening sling (47) when the cage (1) is rotated. The weight of the anchor (48) has to be sufficient to hold the cage (1) at a constant depth even if the partially hollow rims (15) are completely filled with gas.

Figure 12A:
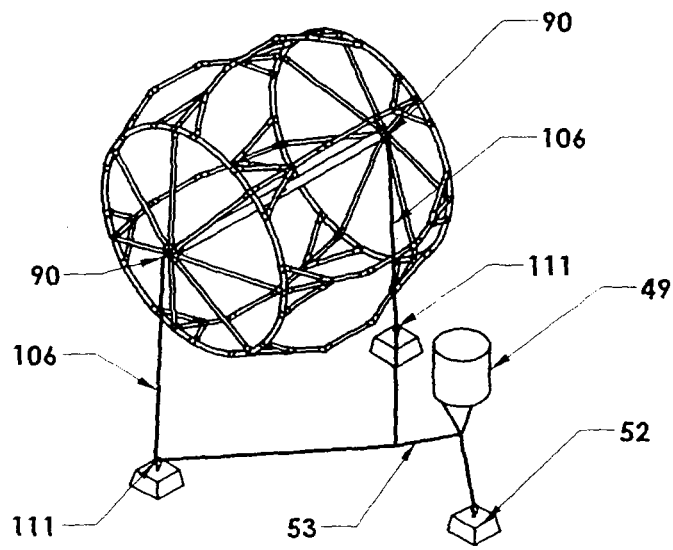
FIG. 12 shows the submersible cage in the A) submerged position and B) surfaced position according to another embodiment of the present invention.

FIG. 12a shows one possible arrangement for controlling the vertical positioning of the cage (1) with respect to the sea bed. In this arrangement, tethering lines (106) are attached to the hub assembly (17) or the motor assembly (90), if present. The tethering lines (106) each pass through a fixation point (111), which in this case is a pulley anchored to the sea bed. The tethering lines (106) converge onto a mooring line (53), which is attached at the other end to a mooring point (52). To control the vertical positioning of the cage (1) a variable buoyancy element (49) is placed along the mooring line (53), between the fixation point (111) and the mooring point (52). In one embodiment, the variable buoyancy element (49) is positioned at the intersection between the tethering lines (106) and the mooring line (52). When the variable buoyancy element (49) is positively buoyant, the cage (1) is pulled towards the sea bed. Conversely, generating a negative buoyancy in the variable buoyancy element (49) will cause the cage (1) to rise to the surface.

Figure 12B:
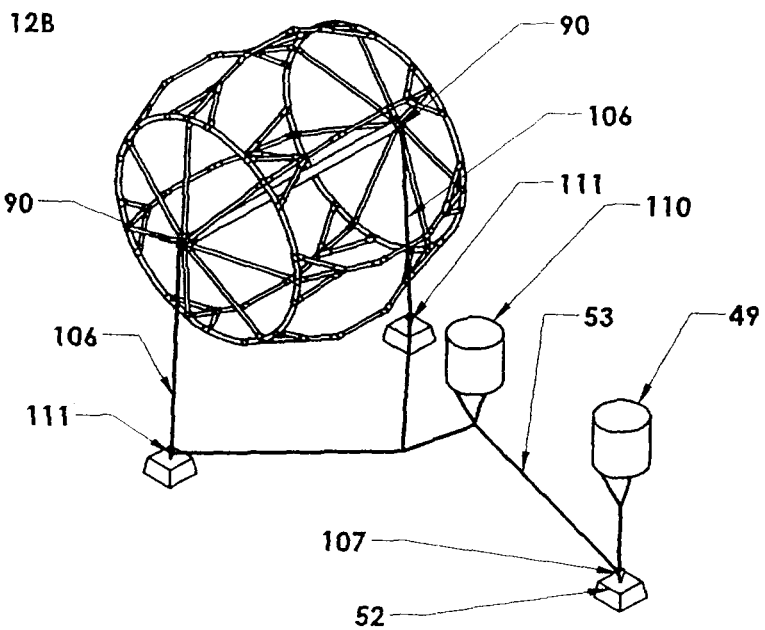
Figure 12C:
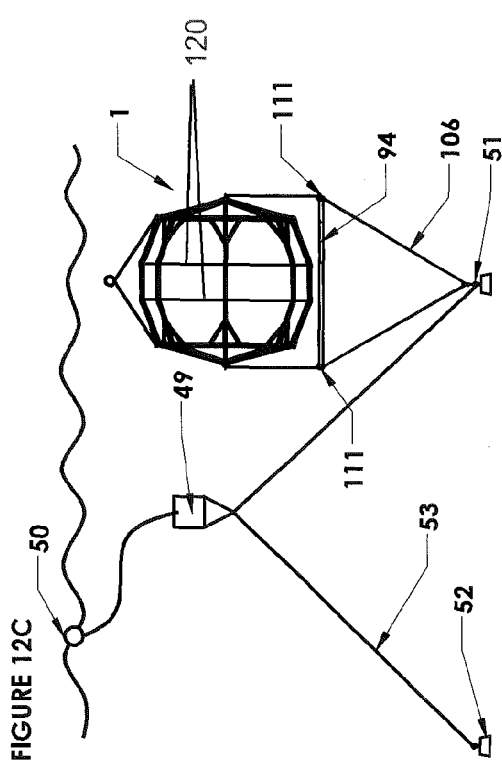
Figure 12D:
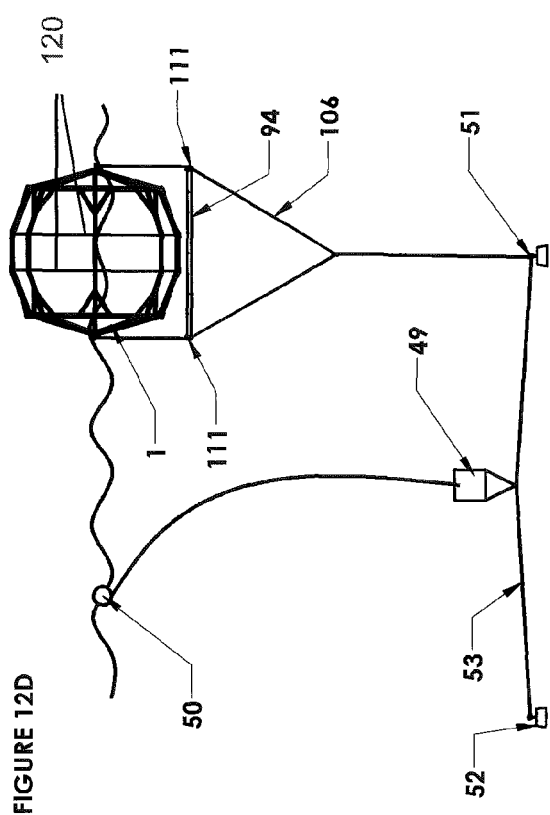

FIG. 12b shows another possible arrangement for controlling the vertical positioning of the cage (1) with respect to the sea bed. In this arrangement second pulley (107) is positioned intermediate to the fixation point (111) and the mooring point (52). To allow for more precise control of the vertical positioning of the cage (1), a second variable buoyancy element (110) can be attached to the mooring line (53) between the fixation point (111) and the second pulley (107). Together the two variable buoyancy elements (49, 110) can steadily control the ascent and descent of the cage (1) through the water so as not to damage fish bladders and other physiology (ie avoid the "bends").

FIG. 12c shows a single point mooring system wherein a controllable variable buoyancy element (49) is used to control the depth of the cage (1) with respect to the environment in which the cage (1) is positioned. The variable buoyancy element (49) is positioned along a mooring line (53) that is connected at one end to a fastening sling (47) and at the other end a mooring point (52). In this instance, the tethering lines (106) are attached to the hub assembly (17) or the motor assembly (90) at one end and converge onto the mooring line (53) after passing through fixation points (111) at either end of the spreader bar (94). The mooring line (53) travels through a pulley (51) towards the mooring point (52). Positioned along the mooring line (53) between the pulley (51) and the mooring point (52) is the variable buoyancy element (49). Gas can be introduced into a hose extending from a buoy (50) on the surface to the variable buoyancy element (49). As a result, the variable buoyancy element (49) rises towards the surface and pulls with it the mooring line (53), which causes the cage (1) to be pulled towards the pulley (51).

FIG. 12d shows the same single mooring system as shown in FIG. 12c wherein a variable buoyancy element (49) is used to control the depth of the cage (1) with respect to the environment in which the cage (1) is positioned. In this case, liquid is introduced into the hose extending from the buoy (50) to the variable buoyancy element (49). The density of the liquid causes the variable buoyancy element (49) to sink towards the seabed and thus removing the tension in the tethering line (53), resulting in the movement of the cage (1) towards the surface. In addition, gas can be introduced into the buoyant structure (2) to assist in the upward movement, or surfacing, of the cage (1).

Together with the rotatability of the cage (1), the above described mooring arrangements provide a system for controlling the rotational and vertical movement of the cage (1) while in a completely submerged position. Since these movements can be controlled remotely, the cage and associated mooring system provides the basis for an automated system for fish farming.

FIG. 13 illustrates a possible arrangement of the cage (1) within a larger support frame (70). The cage (1) is held in place within the larger support frame (70) by mooring lines (64) connected to mooring structures (71) positioned at the corners of the support frame (70). The support frame (70) provides support to the cage (1) in order to limit the horizontal movement of the cage (1) during changes in the environment wherein the cage (1) is placed.

Figure 15A:
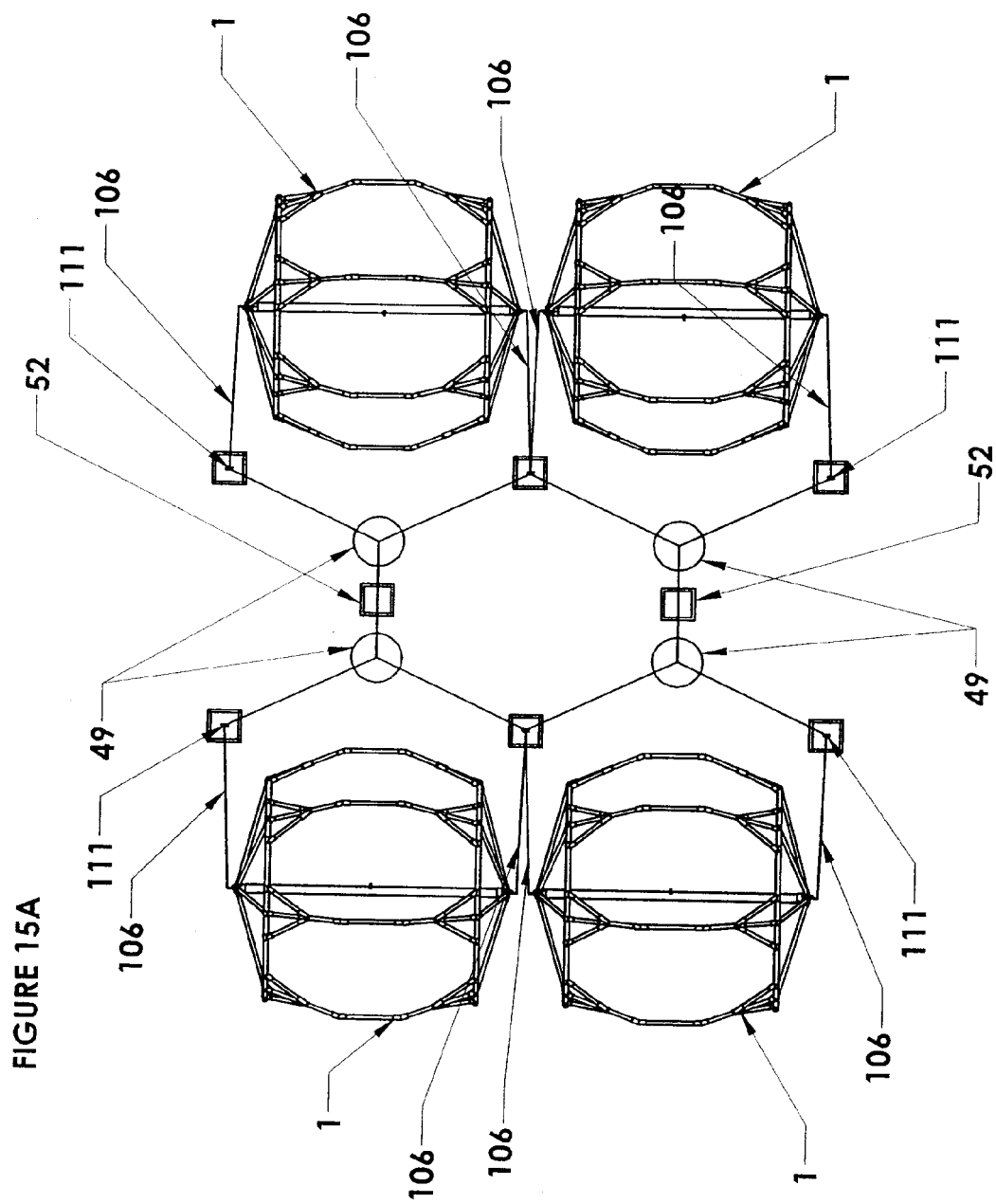

FIG. 14 shows a possible arrangement of several cages using the mooring systems shown in FIGS. 12a-12d. In the arrangement shown in FIG. 14 an anchor (54) forms the center of a formation of several cages (1) in a fish farm. In this particular embodiment, eight cages (1) are linked in a star pattern. Multiple mooring lines (53) are controlled by a one or more controllable variable buoyancy elements (49). The cages (1) are raised and lower in accordance to the method described above. The cages (1) are located in at a suitable distance from the center and from other cages (1) in the formation to avoid collisions and possible entanglement of two or more cages. FIG. 15 shows additional arrangements of several cages using a modified version of the mooring system shown in FIGS. 12a-12d. In particular, FIG. 15a shows how multiple cages (1) can be tethered together to create a fish farm of multiple cages (1). In the arrangement shown in FIG. 15a, tethering lines (106) from adjacent cages (1) share a common fixation point (111), which is comprised of two pulleys, and opposite cages share a common variable buoyancy element (49). This arrangement allows for several cages to be grouped together and connected by common elements, thus decreasing the overall cost of the farm. FIG. 15b illustrates another possible arrangement, which shows how two cages (1) can be connected to a single mooring point (52). As shown in FIG. 15c, this arrangement allows for several sets of cages (1) to be aligned in a manner that increases the number of cages per surface area occupied.

The cage (1) of the present invention can be adapted to be used as a trap for catching fish. An opening (80) is introduced in the netting (3) and a trapping entrance (81) is mounted on the cage (1) at the opening (80). The trapping entrance (81) is preferably funnel shaped. Suitable guiding means (82) are preferably attached to the trapping entrance (81) to guide the aquatic animals towards and into the cage (1). The guiding means (82) of the present invention is preferably a guiding net, which extends from the trapping entrance (81) at a certain angle outwardly from the cage (1) (see FIG. 16). In one embodiment, a sizing exit (83) in introduced opposite the trapping entrance (81). The sizing exit (83) in a net structure with meshes of certain size for selecting only aquatic animals over a certain size and permitting smaller animals, which swim in a straight direction from the trapping entrance (81) pass through.

The present invention has been described with regard to preferred embodiments. However, it will be obvious to persons skilled in the art that a number of variations and modifications can be made without departing from the scope of the invention as described herein.

INDUSTRIAL APPLICABILITY

The present invention is useful in providing a reliably and cost effective cage and automated system for fish farming. Compared to other cages and systems, the design of the present cage provides increased durability and the flexibility to be adapted to a variety of environments. Moreover, the cage design allows it to be adapted into a mooring system that can be used to control the movement of the cage in an automated manner.

The invention claimed is:

1. A submersible cage for aquaculture comprising: a central axle; a buoyant structure having a first wheel positioned at one end of the central axle and a second wheel positioned at the other end of the central axle, the wheels being connected by a plurality of segmented cross members; and a netting for attachment to the inside of the buoyant structure, wherein at least two segments of the cross members are angled away from the wheels and at least a portion of the cross member interconnecting the two angled segments is positioned parallel to the central axle.

2. The submersible cage according to claim 1, wherein the cross member comprises three segments and wherein a first segment is attached and angled away from the first wheel, a second segment is attached and angled away from the second wheel and the remaining segment connecting the first and second segments is positioned parallel to the central axle.

3. A submersible cage for aquaculture according to claim 1, further comprising an actuator in operable communication with at least part of the buoyant structure and adapted to facilitate rotation of the buoyant structure about the central axle.

4. The submersible cage according to claim 3, wherein the actuator is a series of valves in operable communication with the partially hollow cross members to allow controlled adjustment of the buoyancy of each segmented cross member.

5. The submersible cage according to claim 3, wherein the actuator is a motor assembly connected to the hub assembly of each of the first and second wheels, the motor assembly being held in position by a mooring line anchored to the seabed.

6. The submersible cage according to claim 3, wherein the actuator is a series of propulsion means positioned along the segmented cross members and systematically controlled to cause rotation of the buoyant structure about the central axle.

7. The submersible cage according to claim 6, wherein the series of propulsion means are jets.

8. The submersible cage according to claim 1, wherein the first and second wheels each comprise a hub assembly radially connected to a partially hollow rim by a plurality of spokes.

9. The submersible cage according to claim 8, wherein vents or nozzles are provided on the partially hollow rim for introduction or expulsion of a gas or liquid from the partially hollow rim.

10. The submersible cage according to claim 8, wherein one or more of the spokes are partially hollow and adapted to receive a gas or liquid.

11. The submersible cage according to claim 8, wherein the hub assembly comprises an outer sleeve that at least partially encircles the central axle, a series of support points and a hub axle.

12. The submersible cage according to claim 11, wherein the hub axle is removable and interchangeable to allow access to the central axle.

13. The submersible cage according to claim 1, further comprising one or more wheels encircling the central axle and positioned between the first and second wheels.

14. The submersible cage according to claim 1, wherein the netting is made from a high performance polyethylene fiber.

15. The submersible cage according to claim 14, wherein the netting is made from DYNEEMA™ or SPECTRA™ ultra-high-molecular-weight polyethylene.

16. The submersible cage according to claim 1, wherein the buoyant structure is made from an inherently buoyant material.

17. The submersible cage according to claim 16, wherein the buoyant material is high-density polyethylene or a composite containing high-density polyethylene.

18. The submersible cage according to claim 16, wherein the buoyant material is aluminum.

19. The submersible cage according to claim 1, wherein the netting is attached to the inside of the buoyant structure by tension sensors.

20. The submersible cage according to claim 1, further comprising a sweep net extending radially from the central axle to the netting.

21. The submersible cage according to claim 20, wherein the sweep net is arranged helically about the central axle.

22. The submersible cage according to claim 20, further comprising a physical barrier extending radially from the central axle to the netting, which is held stationary while the buoyant structure rotates about the central axle.

23. The submersible cage according to claim 22, wherein the physical barrier is a netting.

24. The submersible cage according to claim 22, wherein the physical barrier is air expelled from the central axle.

25. The submersible cage according to claim 20, wherein a grading panel is provided within the sweep net.

26. The submersible cage according to claim 1, wherein a removable panel or door is provided on the netting.

27. The submersible cage according to claim 1, further comprising a trapping entrance in the netting for entrapping animals, wherein the trapping entrance is substantially funnel-shaped such that animals substantially above a desired size that have entered the cage cannot readily exit the cage through the trapping entrance.

28. The submersible cage according to claim 27, further comprising a guiding net extending from the vicinity of the trapping entrance for guiding animals outside the cage that swim towards the guiding net along the guiding net and to the trapping entrance.

29. The submersible cage according to claim 27, further comprising a sizing exit substantially opposite the trapping entrance for allowing animals below a predetermined size to readily exit the cage.

30. The submersible cage according to claim 1, further comprising support members connecting the cross-members to either the first or second wheel.

31. A system for controlling movement of a submersible cage, said system comprising a submersible cage comprising: a central axle; a buoyant structure having a first wheel positioned at one end of the central axle and a second wheel positioned at the other end of the central axle, the wheels each having a hub assembly radially connected to a partially hollow rim by a plurality of spokes and first and second wheels being connected by a plurality of segmented cross members, wherein at least two segments of the cross members are angled away from the wheels and at least a portion of the cross members interconnecting the two angled segments is positioned parallel to the central axle; a netting for attachment to the inside of the buoyant structure; a motor assembly connected to the hub assembly of each of the first and second wheels; tethering lines attached to each motor assembly, each tethering line passes through a fixation point and converges onto a mooring line that is attached to a mooring; and a variable buoyant element positioned along the mooring line to control the vertical positioning of the submersible cage with respect to the sea bed, whereby activation of the motor assembly causes the buoyant structure to rotate about the central axle and altering the buoyancy in the variable buoyant element controls the vertical positioning of the submersible cage with respect to the seabed.

32. The system according to claim 31, wherein the fixation point is a pulley anchored on the seabed.

33. The system according to claim 32, wherein the variable buoyant element is positioned along the mooring line between the pulley and the mooring point.

34. The system according to claim 32, wherein a first variable buoyant element is positioned along the mooring line between the fixation point and a second pulley and a second variable buoyant element is positioned along the mooring line between a second pulley and the mooring point.

35. The system according to claim 31, further comprising a spreader bar positioned outside the submersible cage for separating the tethering lines and wherein the fixation points are proximate to the ends of the spreader bar.

36. The system according to claim 31, wherein a plurality of submersible cages are circumferentially arranged about a central mooring common to the plurality of submersible cages.

37. The system according to claim 31, wherein two submersible cages are attached to a common mooring.

* * * * *